United States Patent [19]

Bugger et al.

[11] Patent Number: 4,601,620

[45] Date of Patent: Jul. 22, 1986

[54] SECURING APPARATUS

[76] Inventors: Robert O. Bugger, Rte. 4, Box 184; Timothy W. Cotter, Rte. 2, Box 208 B, both of Effingham, Ill. 62401

[21] Appl. No.: 566,228

[22] Filed: Dec. 28, 1983

[51] Int. Cl.[4] .............................................. B60P 3/06

[52] U.S. Cl. ......................................... 410/22; 410/51; 296/65 R

[58] Field of Search ........................ 410/51, 3, 4, 7, 19, 410/22; 296/65 R

[56] References Cited

U.S. PATENT DOCUMENTS

| | | | |
|---|---|---|---|
| 989,906 | 4/1911 | Harp et al. | 410/51 |
| 1,079,248 | 11/1913 | Kohler | 410/51 |
| 4,019,752 | 4/1977 | Leon et al. | 410/7 |
| 4,076,268 | 2/1978 | Hart | 296/65 R |
| 4,093,303 | 6/1978 | Nelson | 296/65 R |
| 4,265,478 | 5/1981 | Korsgaard | 296/65 R |
| 4,325,576 | 4/1982 | Guthrie | 410/51 |
| 4,389,056 | 6/1983 | Tenniswood | 296/65 R |

*Primary Examiner*—Martin P. Schwadron
*Assistant Examiner*—Sheri M. Novack
*Attorney, Agent, or Firm*—Berman, Aisenberg & Platt

[57] ABSTRACT

An apparatus is disclosed which, in the preferred embodiment, is used to secure a wheelchair to a vehicle which is transporting the wheelchair. The apparatus includes an upper securing portion and a lower securing portion operated by a single control element. Two embodiments are described. In a first embodiment the upper securing element includes a sliding plate which engages an upper portion of the wheelchair for one vertical position, and disengages the wheelchair in a second vertical position. In a second embodiment the upper securing element engages the upper portion of a wheelchair by rotation. Both embodiments employ a lower securing element which engages projections on a wheelchair and also grasps the rear axle of the wheelchair.

11 Claims, 7 Drawing Figures

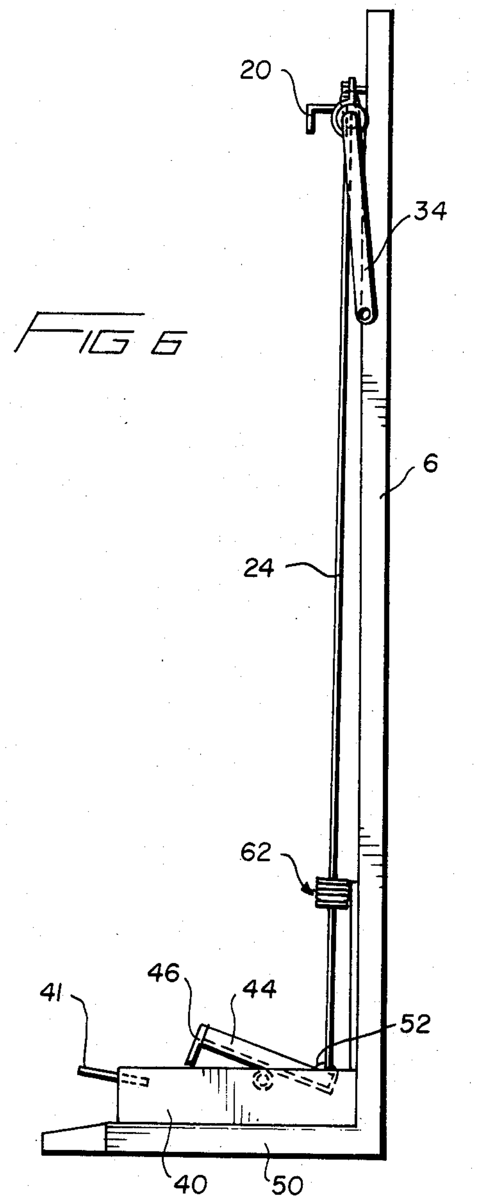
FIG 6
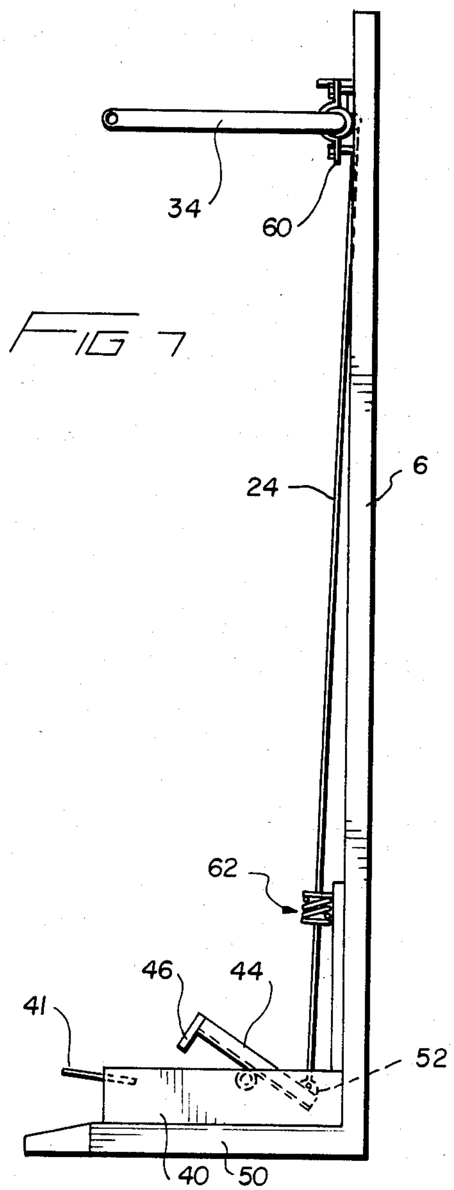
FIG 7
FIG 6A
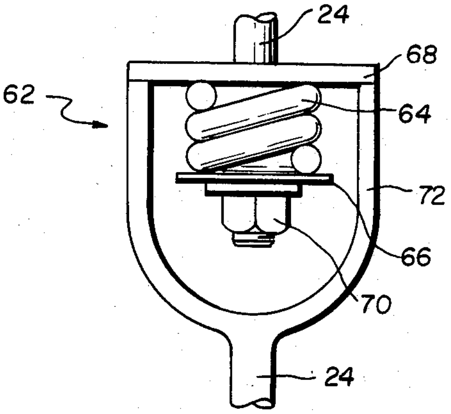
FIG 7A
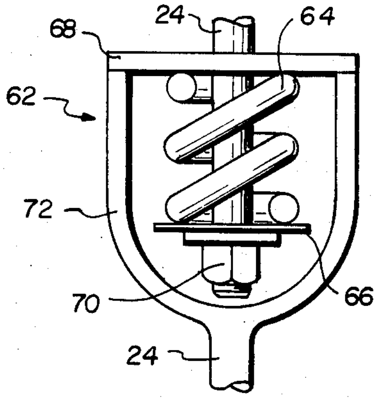

SECURING APPARATUS

TECHNICAL FIELD

This invention relates to the art of safety devices, particularly the art of safety devices for securing a wheelchair to an object, such as a motor vehicle.

BACKGROUND ART

It is frequently necessary for a person confined to a wheelchair to be transported. While it is possible for the person to be transferred from the wheelchair to a seat of a motor vehicle, this is quite time-consuming and require the wheelchair to be of the folding type so that it may be stored in the vehicle. Accordingly, it is common to provide a motor vehicle, such as a van, with enough room for a wheelchair simply to be rolled into the vehicle with the person remaining in the wheelchair. This type of transportation creates a significant safety problem because the wheelchair is difficult to secure to the vehicle and may cause great injury to the occupant of the wheelchair if the vehicle makes a sharp turn, sudden stop, or is involved in an accident.

Several suggestions have been made in the art for devices to secure a wheelchair to a vehicle, but these devices have heretofore been difficult to use, expensive and ineffective.

U.S. Pat. No. 4,265,478 (Korsgaard) shows a device for securing a wheelchair. This device employs a single means for engaging the wheelchair which requires the use of a bracket which may be mounted to a wheelchair for engaging a round bar on a vertical standard. This secures the chairs only at one vertical location, and a safety belt is used to engage the chest of an occupant of the wheelchair.

U.S. Pat. No. 4,076,268 (Hart) shows an apparatus for securing a wheelchair to a vehicle. Brackets are mounted on the floor of the vehicle and have slots for engaging portions of the wheelchair. This apparatus is inconvenient to install and requires a substantial amount of vehicle space to be dedicated to the mounting brackets.

U.S. Pat. No. 4,093,303 (Nelson) shows yet another device for retaining a wheelchair. Elongate elements are secured to the vehicle and extend around the wheelchair to engage forwardly located structural members. This apparatus requires a substantial amount of time to secure the wheelchair and provides no protection against vertical movement.

U.S. Pat. No. 4,389,056 (Tenniswood) discloses a system for automatically securing a wheelchair to a vehicle. A motor causes a linkage system to lower a rear bar of the wheelchair into an anchor. This requires a number of expensive elements which makes this system impractical for widespread use.

SUMMARY OF THE INVENTION

In accordance with the invention, a safety device is provided which has a securing means attached to a vehicle. A pivotable hook-like element has a first position at which it engages the rear axle of the wheelchair and secures it against motion, and a second position at which it releases the axle so that the wheelchair may be moved. Also, a known type of wheelchair has outwardly extending bar-like elements, and the apparatus of the invention includes projections which engage these elements to prevent upward motion of the wheelchair.

The apparatus according to the invention also employs an upper securing means for engaging an upper portion of the wheelchair simultaneously with the engagement of the lower portion of the wheelchair. While it is possible to employ the upper and lower elements separately, it is preferred to use these simultaneously to secure the wheelchair completely.

The upper and lower elements are operated by a common control means so that the apparatus is very easy to use. It is only necessary to roll the wheelchair into proper position and operate the single control means to activate the securing elements.

In one embodiment, the upper element moves linearly in response to operation of the control means, while in a second embodiment the upper element is mounted for rotation in response to operation of the control means.

It is an object of this invention to provide a safety apparatus for securing a wheelchair to an object.

It is a further object of this invention to provide an apparatus whereby a first object may be secured to a second object by means of upper and lower securing devices.

It is a still further object of this invention to provide an apparatus for securing a wheelchair to a vehicle whereby a single control means provides engagement of upper and lower portions of the wheelchair.

BRIEF DESCRIPTION OF THE DRAWINGS

FIG. 6 is a side view of the second embodiment in the closed position.

FIG. 7 is a side view of the second embodiment in the open position.

DETAILED DESCRIPTION

Figure 1:
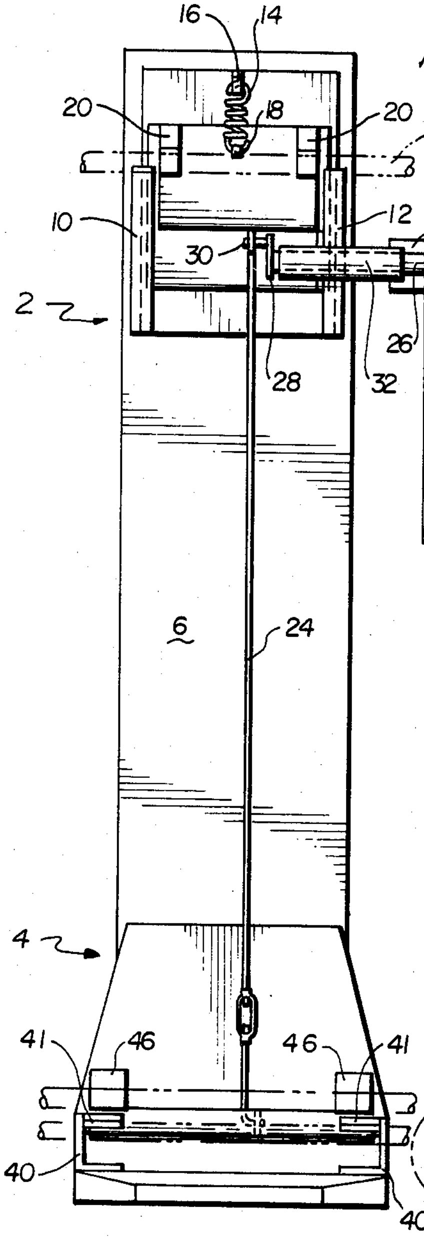
FIG. 1 is a front view of the first embodiment of the invention.

FIG. 1 shows a front view of a first embodiment of an apparatus particularly useful for securing a wheelchair (shown in phantom lines in FIG. 2) for safety purposes. An upper securing means 2 is located vertically above a lower securing means 4. These securing means may be separately attached for example to a vehicle. In the preferred embodiment, they are attached to a backboard 6 which is in turn attached to a vehicle.

The upper and lower securing means 2, 4 are connected by a control means, which will be described in detail hereinafter, so that a common operating element causes the upper and lower securing means to engage or disengage an object to be secured. In the preferred embodiment, this object is a wheelchair.

The upper securing means comprises a sliding plate 8 which is carried by slots 10 and 12. In a preferred embodiment the slots 10 and 12 are formed by sections of angle-iron secured to the backboard 6. A spring 14 is attached to a first hook 16 on an upper portion of the backboard 6 and a second hook 18 on the sliding plate 8. This spring urges the sliding plate 8 upwardly to assist in moving the control means to release an object. When the object to be secured is a wheelchair, a plurality of grasping elements 20 is employed to engage an upper horizontal bar 22 (shown in phantom lines) of the wheelchair. The grasping elements engage and disengage the upper horizontal bar when the sliding plate 8 is in lower and upper vertical positions, respectively.

A control rod 24 connects the upper securing means to the lower securing means and causes the sliding plate 8 to move in the slots 10 and 12. The control rod is connected to a shaft 26 by a cam plate 28. The cam plate 28 is securely fastened to one end of the shaft 26, and the control rod 24 is pivotally attached to the cam plate at a pivotal connection 30. The shaft 26 is mounted in a shaft housing 32 which is in turn connected to the sliding plate 8. A handle 34 is attached to the end of the shaft 26 which is opposite the cam plate 28. The handle is limited in its angular motion by a stop plate 36.

Figure 2:
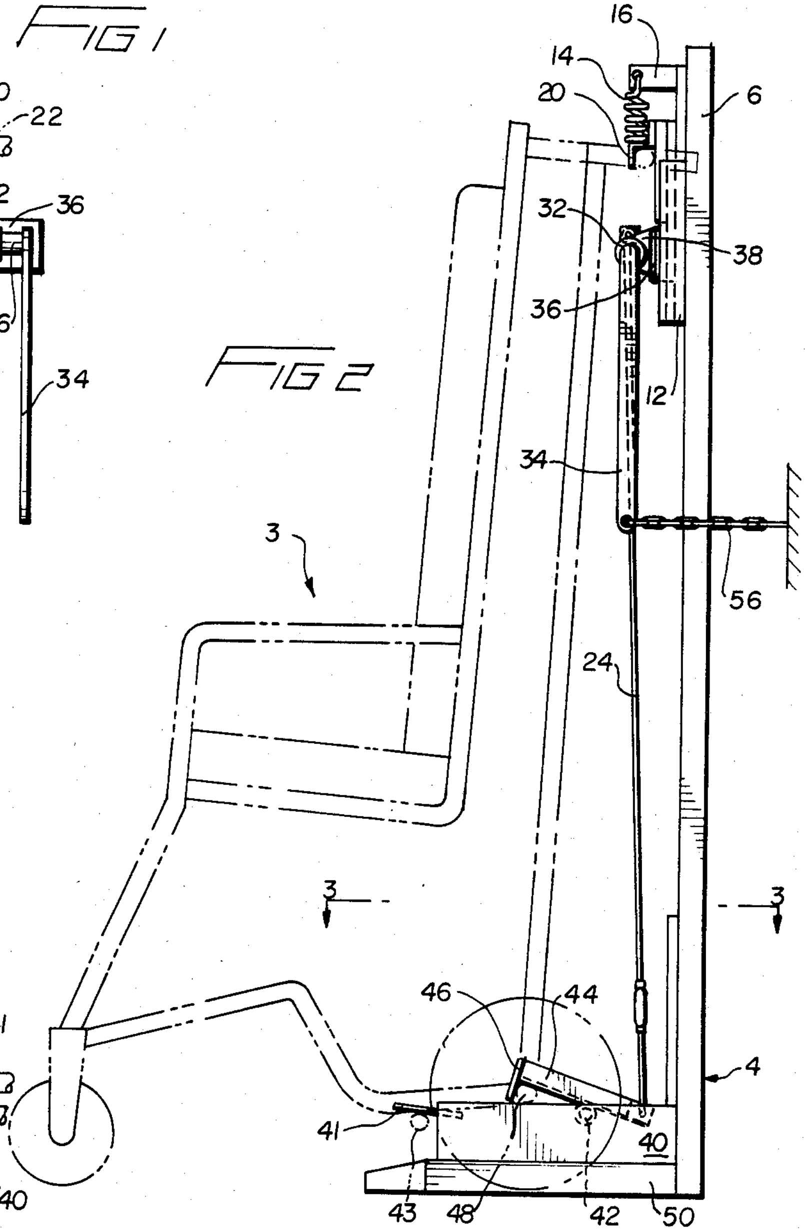
FIG. 2 is a side view of the first embodiment showing a wheelchair in phantom lines.

With reference to FIG. 2, a wheelchair 3 is shown in phantom lines. A mounting bracket 38, secures the shaft housing 32 to the sliding plate 8. Brackets 40 provide a base for securing projection means 41 which engage the bars 43 on the wheelchair. Also, the brackets 40 provide a pivotal mount 42 for an engagement means 44. The engagement means 44 pivots about a shaft and includes engaging elements 46 which hook over a rear axle 48 of wheelchair 3. The mounting brackets 40 are preferably secured to a footplate 50, but they may be secured directly to the floor of a vehicle, if desired.

The wheelchair 3 shown in FIG. 2 is one of several popular types, each of which has the general characteristics shown in FIG. 2. The outwardly extending bars 43, upper bar 22, and axle 48 are known features of these wheelchairs. As will be appreciated, the invention distributes the forces required to hold the chair among six points. This allows the chair to be secured with little danger of the chair breaking.

Figure 3:
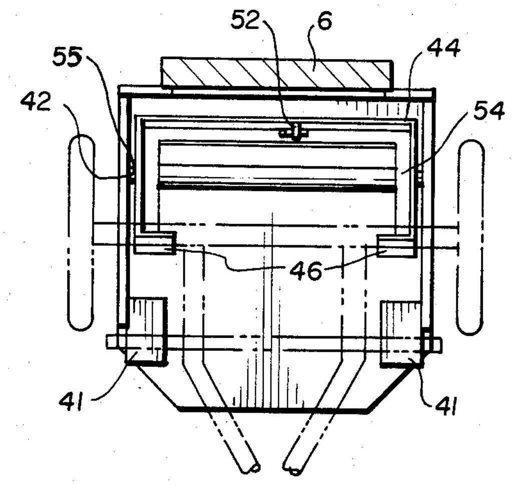
FIG. 3 is a cross section taken along line 3—3 of FIG. 2.

FIG. 3 is a section taken along line 3—3 of FIG. 2 and illustrates how the control rod 24 is connected to a rear part of the engagement means 44 at an eyelet 52. In the preferred embodiment, the engagement means 44 includes a housing 54 and a stationary shaft 56 which carries the housing to permit rotation of the engagement means 44.

Figure 4:
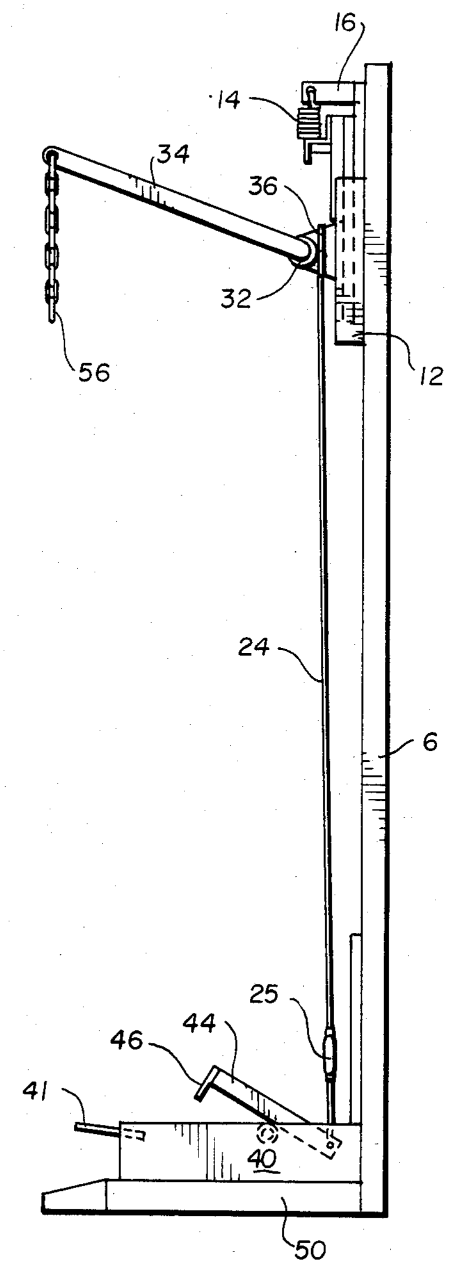
FIG. 4 is a side view of the first embodiment showing the open position.

FIG. 4 is a side view of the first embodiment of the apparatus according to the invention wherein the upper and lower securing means are in their released position.

The operation of the embodiment shown in FIGS. 1 through 4 will now be described. The wheelchair is rolled into position as shown in FIG. 2, and the handle 34 is rotated in a counterclockwise direction to the position shown in FIG. 2. As the wheelchair is rolled into position the projections 41 engage the outwardly extending bars 43 which are located on the wheelchair. As the handle 34 is rotated, the cam plate 28 also rotates, thus pulling upwardly on the control rod 24. The upward pull on the control rod 24 first causes the engagement means 44 to rotate so that the engaging elements 46 move downwardly to hook over the axle 48 of the wheelchair. When the engaging elements 46 contact the axle 48 of the wheelchair, further rotation is prevented. As the handle 34 continues in the counterclockwise direction, the sliding plate 8 begins a downward motion by the pull on the control rod 24. This occurs because the shaft housing 32 is mounted on the sliding plate 8, and the entire combination of the housing 32, the shaft 26, cam plate 28, and the handle 34 thus move downwardly with the sliding plate 8. The length of the control rod 24 is adjustable by a turn buckle 25 so that the distance between the grasping elements 20 and the engagement means 44 may be varied. In the preferred embodiment, this distance is set so that as the pivotal connection 30 rotates just beyond a vertical line, the fastening elements and the engagement means will have securely engaged the upper and lower portions of the wheelchair, and the natural resiliency of the wheelchair will hold the cam plate 28 in an over-center position. The handle will be prevented from further rotation by stop plate 36. A chain 56 or other similar means is used to secure the handle 34 in the position shown in FIG. 2 as an additional safety measure in the event of an accident. It is, however, not necessary to employ the chain 56 since the natural resiliency of the wheelchair will hold the control means in the position shown in FIG. 2.

Figure 5:
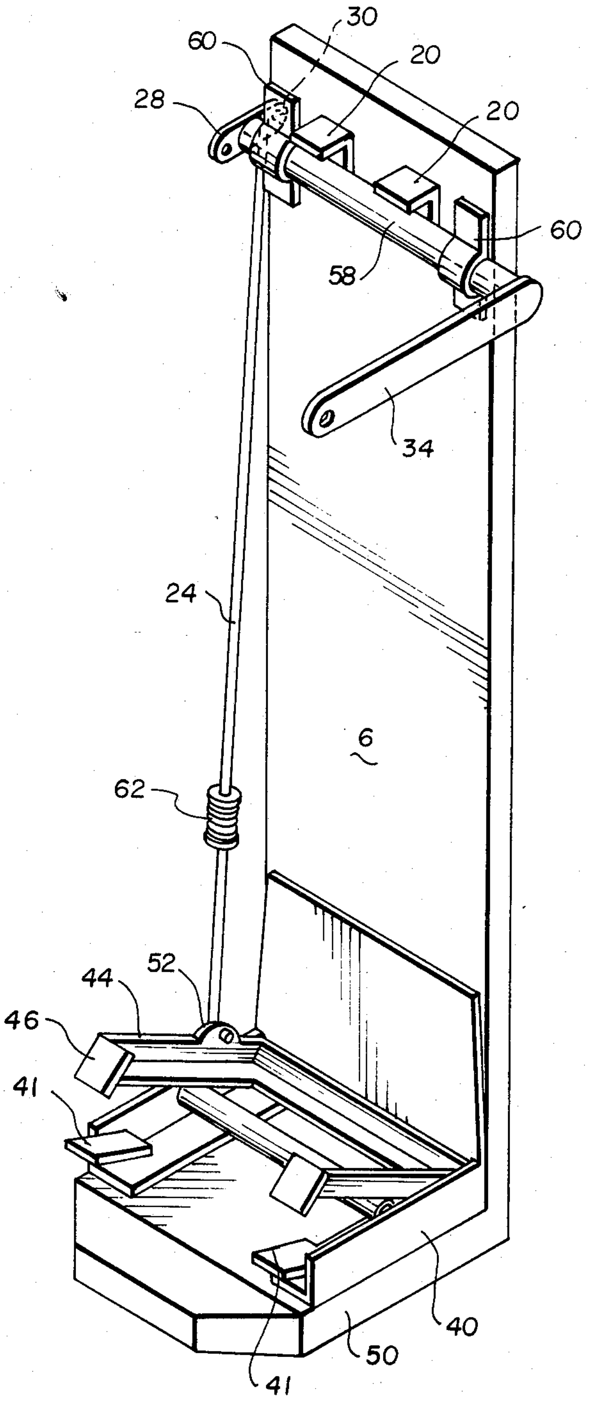
FIG. 5 is a perspective of a second embodiment of the invention.

An alternative embodiment will now be described with respect to FIGS. 5 through 7. FIG. 5 shows an arrangement similar to that shown in FIGS. 1 through 4 wherein the upper securing means has been modified. The lower securing means is identical to that described with reference to FIGS. 1 through 4, and the same reference numerals have been used.

The upper securing means comprises a shaft 58 mounted to the backboard 6 by brackets 60. A handle 34 is connected to the shaft 58 for causing rotation thereof. At an end of the shaft 58 opposite the handle 34 is a cam plate 28 which provides a pivotal connection 30 to the control rod 24 as described with respect the first embodiment. The grasping elements 20 are, however, mounted securely to the shaft 58 for a pivotal rotation with the shaft. Thus, when the handle 34 is rotated in a counterclockwise direction, the grasping elements 20 also rotate so as to engage the upper bar 22 of a wheelchair.

The eyelet 52 is shown in FIGS. 5–7 on one side of the engagement means 44. It may alternatively be located anywhere to the rear of the shaft 56. Cam plate 28 is located on each end of shaft 58 so the control rod 24 and handle 34 may be interchanged.

FIG. 6 shows the second embodiment in an engaged position, while FIG. 7 shows it in a released position.

While the embodiment shown in FIGS. 1 through 4 preferably relies upon the natural spring in the wheelchair to retain the apparatus in the locked position, the embodiment shown in FIGS. 5 through 7 uses a resilient element 62. This element is shown in detail in FIGS. 6A and 7A. The preferred embodiment shown in FIG. 6A includes a spring 64 mounted between a washer 66 and a plate 68. The washer 66 is connected to the upper part of control rod 24 by a nut 70, and the plate 68 is connected to a lower part of the control rod 24 by a bracket 72. When the apparatus is in a secured position, the lower engagement means contacts the axle of the wheelchair, and the upper engagement means contacts the upper bar of the wheelchair. As the handle 34 is rotated into the position shown in FIG. 6, tension is placed on the two parts of the control rod 24 so that the spring 64 is compressed. The spring thus applies a force to hold the handle 34 in the position shown in FIG. 6 since the cam plate 28 will then be in an over-center position. When the handle is rotated to a position shown in FIG. 7 to release the wheelchair the spring 64 will expand as shown in FIG. 7A. Thus, the apparatus will maintain itself in the locked position by the force caused by the spring 54. A stop plate as described with reference to FIGS. 1–4 is used to limit rotation of the handle.

It will thus be appreciated that an apparatus has been described which is useful for securing one object to a second object. In the preferred embodiment, the first object is a wheelchair and the second object is a vehicle used for transporting the wheelchair. It will be appreciated by those of skill in the art that the apparatus may be used to secure many different objects by employing the principles described above. Modifications within the scope of the appended claims will be apparent.

What is claimed is:

1. Apparatus for securing a wheelchair to an object comprising lower securing means fixed to said object including first projection means spaced from a floor of said object extending in a first direction to engage a portion of said wheel chair which extends in a second direction transverse to said first direction and engagement means for engaging a rear axle of said wheelchair to prevent movement of said chair in said first direction; upper securing means for engaging an upper portion of said wheelchair for preventing movement of said chair in said first direction; and control means for moving said upper and lower securing means into positions to hold said axle and said upper portion.

2. Apparatus according to claim 1 wherein each of said engagement means and said upper securing means includes hooks for engaging said axle and said upper portion.

3. Apparatus according to claim 2 wherein said engagement means comprises a hook mounted for rotation about a first axis parallel to said second direction.

4. Apparatus according to claim 3 wherein said upper securing means comprises a hook mounted for rotation about a second axis parallel to said second direction.

5. Apparatus according to claim 3 wherein said upper securing means comprises a hook mounted for linear motion.

6. Apparatus according to claim 4 wherein said control means comprises means for causing said engagement means to rotate to engage said axle and means for causing said upper securing means to rotate to engage said upper portion.

7. Apparatus according to claim 6 wherein said upper securing means comprises an elongate element mounted for rotation about said second axis and said hooks extend outwardly from said elongate element transverse to said second axis.

8. Apparatus according to claim 7 wherein said control means further comprises a rod connected to said upper securing means and said engagement means whereby said rod moves vertically when said elongate element rotates to cause rotation of said engagement means.

9. Apparatus according to claim 5 wherein said control means comprises means for causing said engagement means to rotate to engage said axle and for causing said upper securing means to move linearly to engage said upper portion.

10. Apparatus for securing a wheelchair having an axle housing to an object comprising upper securing means for engaging an upper part of said wheelchair and lower securing means for securing said axle housing and control means having a single control handle means for moving each of said upper and lower securing means into engaging and non-engaging positions.

11. Apparatus according to claim 10 further comprising fixed projection means extending outwardly from said lower securing means for engaging outwardly extending bars on said wheelchair.

* * * * *